United States Patent
Li

(10) Patent No.: US 12,411,846 B1
(45) Date of Patent: Sep. 9, 2025

(54) SYSTEM AND METHOD FOR BATCHING DATABASE QUERIES

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/820,822

(22) Filed: Aug. 30, 2024

(51) Int. Cl.
  *G06F 16/2453* (2019.01)
  *G06F 9/54* (2006.01)
  *G06F 11/34* (2006.01)
  *G06F 16/23* (2019.01)

(52) U.S. Cl.
  CPC ........ *G06F 16/24535* (2019.01); *G06F 9/546* (2013.01); *G06F 11/3409* (2013.01); *G06F 16/2386* (2019.01)

(58) Field of Classification Search
  CPC .............. G06F 16/24535; G06F 9/546; G06F 11/3409; G06F 16/2386
  USPC ........................................................ 707/713
  See application file for complete search history.

(56) References Cited

U.S. PATENT DOCUMENTS

| | | | |
|---|---|---|---|
| 2009/0216718 A1* | 8/2009 | Agrawal | G06F 16/24549 |
| 2021/0374135 A1* | 12/2021 | Cruanes | G06F 16/24539 |
| 2022/0245140 A1* | 8/2022 | Gylfason | G06F 16/2425 |
| 2024/0345877 A1* | 10/2024 | Demura | G06F 9/547 |

OTHER PUBLICATIONS

Oracle® Streams Advanced Queuing User's Guide and Reference Release 10.1 Part No. B10785-01 (Year: 2003).*
OracleÂ® Retail Merchandising Cloud Services Batch Operations Guide (Year: 2023).*

* cited by examiner

*Primary Examiner* — Kuen S Lu
(74) *Attorney, Agent, or Firm* — Buckley, Maschoff & Talwalkar LLC

(57) ABSTRACT

Systems and methods include reception of a plurality of database queries, determination of a first set of database queries from the plurality of database queries, where each of the first set of database queries requests data from a same database table, and where a total count of returned records for the first set of database queries is less than a threshold, merge of the first set of database queries into a batch query, transmission of the batch query to a database, reception of a batch query result set from the database, determination, for each of the first set of database queries, of a result set from the batch query result set, and return of the result sets for each of the first set of database queries.

14 Claims, 12 Drawing Sheets

300

| QUERY NO. | TABLE ID | RECORD COUNT |
|---|---|---|
| 1 | T05 | 300 |
| 2 | T05 | 700 |
| 3 | T02 | 300 |
| 4 | T05 | 700 |
| 5 | T04 | 1000 |
| 6 | T05 | 800 |

| QUERY NO. | TABLE ID | RECORD COUNT |
|---|---|---|
| 2 | T05 | 700 |
| 3 | T02 | 300 |
| 4 | T05 | 700 |
| 5 | T04 | 1000 |
| 6 | T05 | 800 |

350

| QUERY NO. |
|---|
| 1 |

| QUERY NO. | TABLE ID | RECORD COUNT |
|---|---|---|
| 3 | T02 | 300 |
| 4 | T05 | 700 |
| 5 | T04 | 1000 |
| 6 | T05 | 800 |

350

| QUERY NO. |
|---|
| 1 |
| 2 |

| QUERY NO. | TABLE ID | RECORD COUNT |
|---|---|---|
| 3 | T02 | 300 |
| 5 | T04 | 1000 |
| 6 | T05 | 800 |

350

| QUERY NO. |
|---|
| 1 |
| 2 |
| 4 |

*FIG. 3D*

| Query No. | Query |
|---|---|
| query1 | SELECT o.ORDER_ID, o.ORDER_DATE, o.ORDER_PRICE, o.ORDER_STATUS, p.PRODUCT_NAME, p.PRODUCT_DESC FROM TENANT1_SCHEMA.ORDERS o, TENANT1_SCHEMA.PRODUCT p WHERE o.PRODUCT_ID = p. PRODUCT_ID AND o.ORDER_DATE > '2020-02-01' ORDER BY o.ORDER_DATE LIMIT 200 OFFSET 0 |
| query2 | SELECT o.ORDER_ID, o.ORDER_DATE, o.ORDER_PRICE, o.ORDER_STATUS, p.PRODUCT_NAME, p.PRODUCT_DESC FROM TENANT2_SCHEMA.ORDERS o, TENANT2_SCHEMA.PRODUCT p WHERE o.PRODUCT_ID = p. PRODUCT_ID AND o.ORDER_ID < 'a123' ORDER BY o.ORDER_ID LIMIT 200 OFFSET 200 |
| query3 | SELECT o.ORDER_ID, o.ORDER_DATE, o.ORDER_PRICE, o.ORDER_STATUS, p.PRODUCT_NAME, p.PRODUCT_DESC FROM TENANT3_SCHEMA.ORDERS o, TENANT3_SCHEMA.PRODUCT p WHERE o.PRODUCT_ID = p. PRODUCT_ID AND o.ORDER_PRICE > 555 ORDER BY o.ORDER_PRICE LIMIT 200 OFFSET 400 |
| query4 | SELECT o.ORDER_ID, o.ORDER_DATE, o.ORDER_PRICE, o.ORDER_STATUS, p.PRODUCT_NAME, p.PRODUCT_DESC FROM TENANT4_SCHEMA.ORDERS o, TENANT4_SCHEMA.PRODUCT p WHERE o.PRODUCT_ID = p. PRODUCT_ID AND o.ORDER_STATUS = 'DONE' ORDER BY o.ORDER_PRICE LIMIT 200 OFFSET 600 |
| query5 | SELECT o.ORDER_ID, o.ORDER_DATE, o.ORDER_PRICE, o.ORDER_STATUS, p.PRODUCT_NAME, p.PRODUCT_DESC FROM TENANT5_SCHEMA.ORDERS o, TENANT5_SCHEMA.PRODUCT p WHERE o.PRODUCT_ID = p. PRODUCT_ID AND p.PRODUCT_ID = 123 ORDER BY o.ORDER_PRICE LIMIT 200 OFFSET 800 |

```
(SELECT 'query1' AS UNIQ_QUERY_ID, o.ORDER_ID, o.ORDER_DATE, o.ORDER_PRICE, o.ORDER_STATUS,
p.PRODUCT_NAME, p.PRODUCT_DESC FROM TENANT1_SCHEMA.ORDER o, TENANT1_SCHEMA.PRODUCT p
WHERE o.PRODUCT_ID = p.PRODUCT_ID AND o.ORDER_DATE > '2020-02-01' ORDER BY o.ORDER_DATE LIMIT
200 OFFSET 0)
UNION ALL (SELECT 'query2' AS UNIQ_QUERY_ID, o.ORDER_ID, o.ORDER_DATE, o.ORDER_PRICE,
o.ORDER_STATUS, p.PRODUCT_NAME, p.PRODUCT_DESC FROM TENANT2_SCHEMA.ORDER o,
TENANT2_SCHEMA.PRODUCT p WHERE o.PRODUCT_ID = p.PRODUCT_ID AND o.ORDER_ID < 'a123' ORDER BY
o.ORDER_ID LIMIT 200 OFFSET 200)
UNION ALL (SELECT 'query3' AS UNIQ_QUERY_ID, o.ORDER_ID, o.ORDER_DATE, o.ORDER_PRICE,
o.ORDER_STATUS, p.PRODUCT_NAME, p.PRODUCT_DESC FROM TENANT3_SCHEMA.ORDER o,
TENANT3_SCHEMA.PRODUCT p WHERE o.PRODUCT_ID = p.PRODUCT_ID AND o.ORDER_PRICE > 555 ORDER BY
o.ORDER_PRICE LIMIT 200 OFFSET 400)
UNION ALL (SELECT 'query4' AS UNIQ_QUERY_ID, o.ORDER_ID, o.ORDER_DATE, o.ORDER_PRICE,
o.ORDER_STATUS, p.PRODUCT_NAME, p.PRODUCT_DESC FROM TENANT4_SCHEMA.ORDER o,
TENANT4_SCHEMA.PRODUCT p WHERE o.PRODUCT_ID = p.PRODUCT_ID AND o.ORDER_STATUS = 'DONE'
ORDER BY o.ORDER_PRICE LIMIT 200 OFFSET 600)
UNION ALL (SELECT 'query5' AS UNIQ_QUERY_ID, o.ORDER_ID, o.ORDER_DATE, o.ORDER_PRICE,
o.ORDER_STATUS, p.PRODUCT_NAME, p.PRODUCT_DESC FROM TENANT5_SCHEMA.ORDER o,
TENANT5_SCHEMA.PRODUCT p WHERE o.PRODUCT_ID = p.PRODUCT_ID AND p.PRODUCT_ID = 123 ORDER BY
o.ORDER_PRICE LIMIT 200 OFFSET 800)
```

FIG. 5

| UNIQ_QUERY_ID | ORDER_ID | ORDER_DATE | ORDER_PRICE | ORDER_STATUS | PRODUCT_NAME | PRODUCT_DESC |
|---|---|---|---|---|---|---|
| query1 | <data> | <data> | <data> | <data> | <data> | <data> |
| query1 | <data> | <data> | <data> | <data> | <data> | <data> |
| ... | ... | ... | ... | ... | ... | ... |
| query2 | <data> | <data> | <data> | <data> | <data> | <data> |
| query2 | <data> | <data> | <data> | <data> | <data> | <data> |
| ... | ... | ... | ... | ... | ... | ... |
| query3 | <data> | <data> | <data> | <data> | <data> | <data> |
| query3 | <data> | <data> | <data> | <data> | <data> | <data> |
| ... | ... | ... | ... | ... | ... | ... |
| query4 | <data> | <data> | <data> | <data> | <data> | <data> |
| query4 | <data> | <data> | <data> | <data> | <data> | <data> |
| ... | ... | ... | ... | ... | ... | ... |
| query5 | <data> | <data> | <data> | <data> | <data> | <data> |
| query5 | <data> | <data> | <data> | <data> | <data> | <data> |
| ... | ... | ... | ... | ... | ... | ... |

| Query No. | Query |
|---|---|
| query1 | SELECT o.ORDER_ID, o.ORDER_DATE, o.ORDER_STATUS, p.PRODUCT_NAME, p.PRODUCT_DESC FROM TENANT1_SCHEMA.ORDERS o, TENANT1_SCHEMA.PRODUCT p WHERE o.PRODUCT_ID = p.PRODUCT_ID AND o.ORDER_DATE > '2020-02-01' ORDER BY o.ORDER_DATE LIMIT 200 OFFSET 0 |
| query2 | SELECT o.ORDER_ID, o.ORDER_DATE, o.ORDER_PRICE, p.PRODUCT_NAME, p.PRODUCT_DESC FROM TENANT2_SCHEMA.ORDERS o, TENANT2_SCHEMA.PRODUCT p WHERE o.PRODUCT_ID = p.PRODUCT_ID AND o.ORDER_ID < 'a123' ORDER BY o.ORDER_ID LIMIT 200 OFFSET 200 |
| query3 | SELECT o.ORDER_ID, o.ORDER_DATE, o.ORDER_PRICE, o.ORDER_STATUS, p.PRODUCT_DESC FROM TENANT3_SCHEMA.ORDERS o, TENANT3_SCHEMA.PRODUCT p WHERE o.PRODUCT_ID = p. PRODUCT_ID AND o.ORDER_PRICE > 555 ORDER BY o.ORDER_PRICE LIMIT 200 OFFSET 400 |
| query4 | SELECT o.ORDER_ID, o.ORDER_DATE, o.ORDER_PRICE, o.ORDER_STATUS, p.PRODUCT_NAME FROM TENANT4_SCHEMA.ORDERS o, TENANT4_SCHEMA.PRODUCT p WHERE o.PRODUCT_ID = p.PRODUCT_ID AND o.ORDER_STATUS = 'DONE' ORDER BY o.ORDER_PRICE LIMIT 200 OFFSET 600 |
| query5 | SELECT o.ORDER_ID, o.ORDER_DATE, o.ORDER_PRICE, o.ORDER_STATUS, p.PRODUCT_NAME, p.PRODUCT_DESC, p.PRODUCT_VENDOR FROM TENANT5_SCHEMA.ORDERS o, TENANT5_SCHEMA.PRODUCT p WHERE o.PRODUCT_ID = p.PRODUCT_ID AND p.PRODUCT_ID = 123 ORDER BY o.ORDER_PRICE LIMIT 200 OFFSET 800 |

(SELECT *'query1' AS UNIQ_QUERY_ID*, o.ORDER_ID, o.ORDER_DATE, NULL AS "o.ORDER_PRICE", o.ORDER_STATUS, p.PRODUCT_NAME, p.PRODUCT_DESC, NULL AS "p.PRODUCT_VENDOR" FROM TENANT1_SCHEMA.ORDER o, TENANT1_SCHEMA.PRODUCT p WHERE o.PRODUCT_ID = p.PRODUCT_ID AND o. ORDER_DATE > '2020-02-01' ORDER BY o.ORDER_DATE LIMIT 200 OFFSET 0)
UNION ALL (SELECT *'query2' AS UNIQ_QUERY_ID*, o.ORDER_ID, o.ORDER_DATE, o.ORDER_PRICE, NULL AS "o.ORDER_STATUS", p.PRODUCT_NAME, p.PRODUCT_DESC, NULL AS "p.PRODUCT_VENDOR" FROM TENANT2_SCHEMA.ORDER o, TENANT2_SCHEMA.PRODUCT p WHERE o.PRODUCT_ID = p.PRODUCT_ID AND o. ORDER_ID < 'a123' ORDER BY o.ORDER_ID LIMIT 200 OFFSET 200)
UNION ALL (SELECT *'query3' AS UNIQ_QUERY_ID*, o.ORDER_ID, o.ORDER_DATE, o.ORDER_PRICE, o.ORDER_STATUS, NULL AS "p.PRODUCT_NAME", p.PRODUCT_DESC, NULL AS "p.PRODUCT_VENDOR" FROM TENANT3_SCHEMA.ORDER o, TENANT3_SCHEMA.PRODUCT p WHERE o.PRODUCT_ID = p.PRODUCT_ID AND o. ORDER_PRICE > 555 ORDER BY o.ORDER_PRICE LIMIT 200 OFFSET 400)
UNION ALL (SELECT *'query4' AS UNIQ_QUERY_ID*, o.ORDER_ID, o.ORDER_DATE, o.ORDER_PRICE, o.ORDER_STATUS, p.PRODUCT_NAME, NULL AS "p.PRODUCT_DESC", NULL AS "p.PRODUCT_VENDOR" FROM TENANT4_SCHEMA.ORDER o, TENANT4_SCHEMA.PRODUCT p WHERE o.PRODUCT_ID = p.PRODUCT_ID AND o.ORDER_STATUS = 'DONE' ORDER BY o.ORDER_PRICE LIMIT 200 OFFSET 600)
UNION ALL (SELECT *'query5' AS UNIQ_QUERY_ID*, o.ORDER_ID, o.ORDER_DATE, o.ORDER_PRICE, o.ORDER_STATUS, p.PRODUCT_NAME, p.PRODUCT_DESC, p.PRODUCT_VENDOR FROM TENANT5_SCHEMA.ORDER o, TENANT5_SCHEMA.PRODUCT p WHERE o.PRODUCT_ID = p.PRODUCT_ID AND p.PRODUCT_ID = 123 ORDER BY o.ORDER_PRICE LIMIT 200 OFFSET 800)

*FIG. 8*

| UNIQ_QUERY_ID | ORDER_ID | ORDER_DATE | ORDER_PRICE | ORDER_STATUS | PRODUCT_NAME | PRODUCT_DESC | PRODUCT_VENDOR |
|---|---|---|---|---|---|---|---|
| query1 | <data> | <data> | NULL | <data> | <data> | <data> | NULL |
| query1 | <data> | <data> | NULL | <data> | <data> | <data> | NULL |
| ... | ... | ... | ... | ... | ... | ... | ... |
| query2 | <data> | <data> | <data> | NULL | <data> | <data> | NULL |
| query2 | <data> | <data> | <data> | NULL | <data> | <data> | NULL |
| ... | ... | ... | ... | ... | ... | ... | ... |
| query3 | <data> | <data> | <data> | <data> | NULL | <data> | NULL |
| query3 | <data> | <data> | <data> | <data> | NULL | <data> | NULL |
| ... | ... | ... | ... | ... | ... | ... | ... |
| query4 | <data> | <data> | <data> | <data> | <data> | NULL | NULL |
| query4 | <data> | <data> | <data> | <data> | <data> | NULL | NULL |
| ... | ... | ... | ... | ... | ... | ... | ... |
| query5 | <data> | <data> | <data> | <data> | <data> | <data> | <data> |
| query5 | <data> | <data> | <data> | <data> | <data> | <data> | <data> |
| ... | ... | ... | ... | ... | ... | ... | ... |

FIG. 9

SYSTEM AND METHOD FOR BATCHING DATABASE QUERIES

BACKGROUND

Today's organizations collect and store large sets of data at an ever-increasing rate. The data is used for day-to-day operations (e.g., sales, production) as well as for analysis (e.g., planning, forecasting). The volume of data accessed and the frequency of data access often place high demands on the systems which store such data. As a result, data access from time-to-time becomes a bottleneck to the functioning of the organization.

Software applications are increasingly provided using a Software-as-a-Service (SaaS) model, in which many users of many different organizations use the same application and data storage system (e.g., a database). This type of deployment further stresses the data storage system and may limit the throughput of the software service.

For example, multiple users may contemporaneously visit a delivery tracking page of a delivery application to track the location of a shipment. In response, the page sends multiple corresponding query requests to a backend database. If only one database connection is available because the database is otherwise busy, the queries are sent over that database connection serially, where a query cannot be sent until a response to a prior request has been returned. The resulting delay may adversely affect the user experience.

Systems are desired for improving the efficiency with which queries may be transmitted and responded to over a database connection. Improving this efficiency may effectively increase the capacity of a client application to respond to user requests.

BRIEF DESCRIPTION OF THE DRAWINGS

FIGS. 3A through 3D illustrate contents of a queue of queries and a query batch over time according to some embodiments.

FIG. 4 illustrates a queue of queries according to some embodiments.

FIG. 5 illustrates a batch query according to some embodiments.

FIG. 6 illustrates a result set of a batch query according to some embodiments.

FIG. 7 illustrates a queue of queries according to some embodiments.

FIG. 8 illustrates a batch query according to some embodiments.

FIG. 9 illustrates a result set of a batch query according to some embodiments.

DETAILED DESCRIPTION

The following description is provided to enable any person in the art to make and use the described embodiments. Various modifications, however, will remain readily-apparent to those in the art.

Some embodiments facilitate efficient batching of queries, such as queries within a database connection queue. Queries may be batched based on the database tables from which they SELECT and the number of table records expected to be returned. To support batching of multi-tenant queries, batched queries are not limited to the same database schema. Thus, a batch query may include two or more queries from two different users from a single tenant, two or more queries from users from two or more tenants or a combination of both.

According to some embodiments, a batch query is transmitted to a database and a batch query result set is received in response. A result set for each individual query of the batch query is determined from the batch query result set. Then, the result set determined for each individual query is returned as a response to the individual query. Embodiments may therefore reduce consumption of network bandwidth and disk I/O while increasing the speed at which queries are processed. In addition, according to some embodiments, a size limitation on the batch query is placed. This can mitigate the delay which would be otherwise experienced by a subsequent individual query due to execution of a large batch query.

Figure 1:
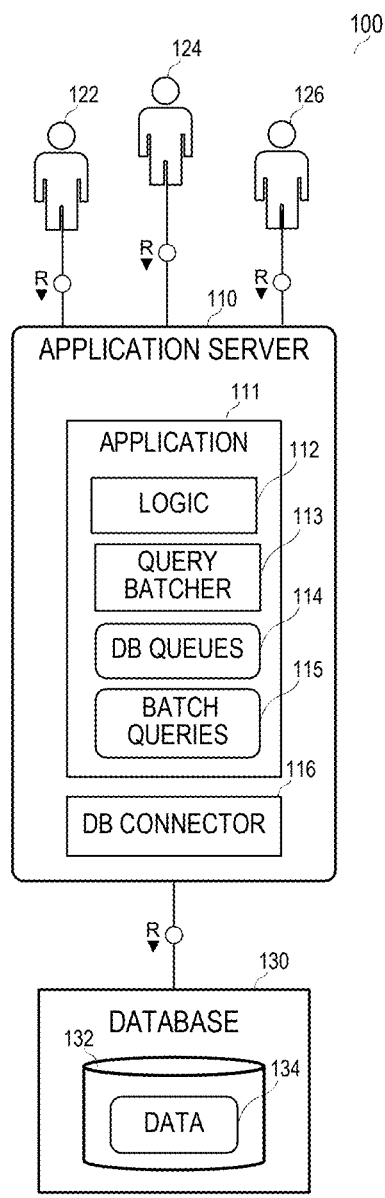
FIG. 1 illustrates an architecture for providing a software application according to some embodiments.

FIG. 1 illustrates system 100 according to some embodiments. Each of the illustrated components may be implemented using any suitable combination of local, on-premise, cloud-based, distributed (e.g., including distributed storage and/or compute nodes) computing hardware and/or software that is or becomes known. Each component described herein may be executed by one or more physical and/or virtualized servers.

Two or more components of FIG. 1 may be co-located. In some embodiments, two or more components are implemented by a single computing device. One or more components may be implemented by a cloud service (e.g., Software-as-a-Service, Platform-as-a-Service). A cloud-based implementation of any components of FIG. 1 may apportion computing resources elastically according to demand, need, price, and/or any other metric.

A cloud-based implementation of system 100 may utilize a container orchestration platform such as but not limited to Kubernetes. Kubernetes is an open-source system for automating deployment, scaling, and management of containerized applications. Each component of system 100 may therefore be implemented by one or more servers (real and/or virtual) or containers.

Application server 110 may comprise one or more servers, virtual machines, clusters of a container orchestration system, etc. Application server 110 may provide an operating system, services, I/O, storage, libraries, frameworks, etc. to applications executing therein. Application server 110 may execute any number of applications, one or more of which may comprise a multi-tenant application.

Logic 112 of application 111 may comprise program code executable to provide functionality to users such as users 122, 124 and 126. The functionality may comprise any functionality that is or becomes known, and providing such functionality may require access to data 134 stored in storage device 132 of database 130.

Database 130 may comprise any query-responsive system for data storage and retrieval that is or becomes known. Database 130 may be on-premise, cloud-based, and/or distributed. Storage device 132 may comprise one or more solid state and/or platter-based fixed disks, non-volatile random-access memories, etc. Data 134 may include database tables conforming to one or more database schemas, in row-based, column-based or other formats.

In one example, user 122 may operate a user device (not shown) to execute a Web browser or another client application which provides access to user interfaces of application 111 through a network (also not shown). User 122 submits a request to application 111 via such a user interface. The request may comprise a request to create, read, update and/or delete data of data 134. In response, application server 110 executes logic 112 to determine one or more queries of database 130 which are required to respond to the request. The queries are transmitted to database 130 via database connector 115 and corresponding result sets are received from database 130. Logic 130 uses the result sets to formulate a response to the original request and returns the response to user 122.

Application 111 and/or database 130 may support multi-tenancy, thereby allowing two or more tenants to share hardware and software thereof. A multi-tenant application may execute in a single execution environment (e.g., a single virtual server) and serve requests received from users of two or more tenants. A multi-tenant database may logically separate data of different tenants and simultaneously support two or more database schemas. For example, a single table of data 134 may include data of two or more tenants and implement elements of the respective database schemas of each tenant.

Database connector 116 communicates with database 130 over a database connection. Database 130 may expose one or more database connections over which database connector 116 may communicate with database 130. The connections may be available via a connection pool which is maintained by an external system (not shown) or by application 111.

A query cannot be sent over a database connection until a response to a prior query sent over that connection has been received (or times out). Accordingly, if all database connections are busy, queries to be sent to database 130 are queued in database queues 114 until a database connection becomes available. Database queues 114 may include a single queue or one queue per database connection. In some implementations, database queues 114 operate in a first-in-first-out (FIFO) manner such the database query that is stored first in the queue is the first one forwarded out of the queue to the available database connector. As will be described later, implementations of the present embodiments will rearrange some of the queued database queries to an available database connector such that the FIFO operation is not always followed.

Query batcher 113 comprises program code executable to perform the query batching operations described herein. Briefly, query batcher 113 inspects a database queue 114 to identify queued queries which may be efficiently batched into a batch query and stored as batch queries 115. In other words, query batcher 113 merges a plurality of queued queries into a single batch query of batch queries 115. Query batcher 113 transmits a batch query to database 130 when a database connection (e.g., the database connection corresponding to the database) becomes available. In some implementations, a result record count or other sizing of the anticipated results is determined from the generated batch query. If the anticipated result size is above a threshold, a different batching of queries is determined to try and reduce the result size, The returned result set is parsed to determine a result set for each query used to create the batch query, and the result sets of each query are returned.

System 100 may comprise any number of unshown hardware and software components, including but not limited to gateways, routers, redundant components, etc.

Figure 2A:
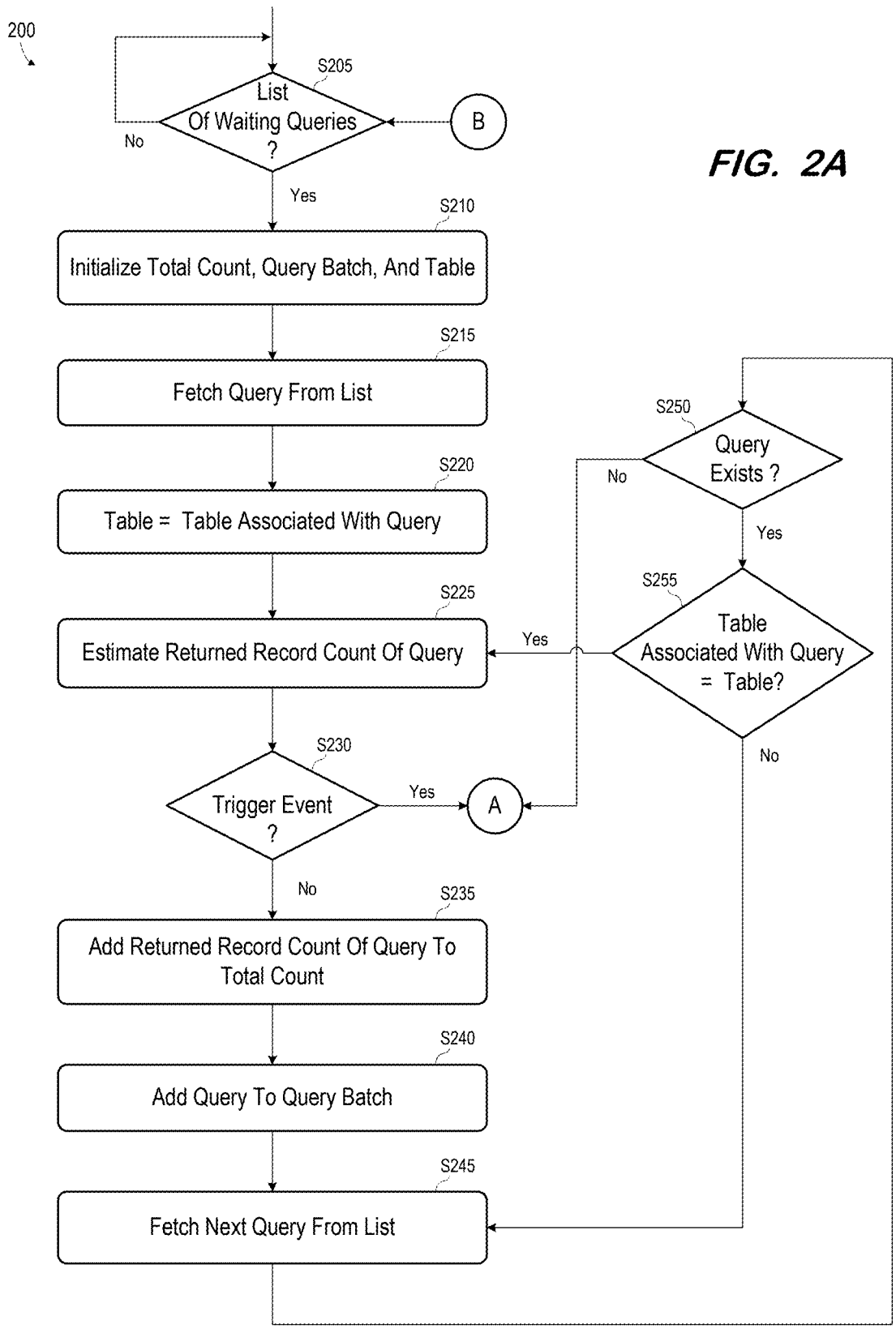
FIGS. 2A and 2B comprise a flow diagram of a process to batch queued queries according to some embodiments.
Figure 2B:
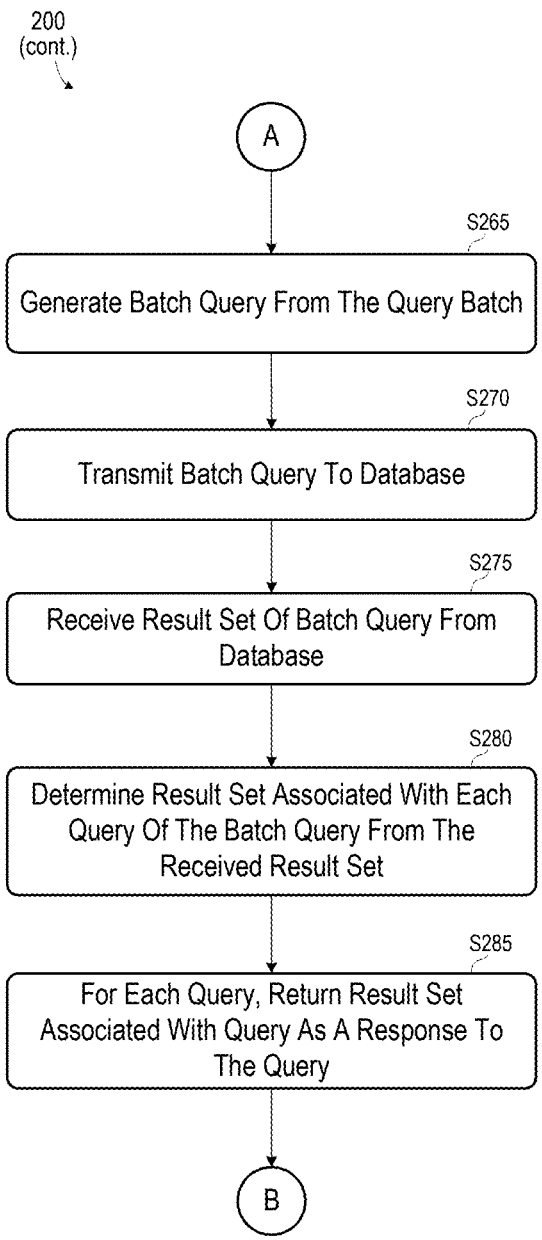

FIGS. 2A and 2B comprise a flow diagram of process 200 to batch queued queries according to some embodiments. Process 200 and the other processes described herein may be performed using any suitable combination of hardware and software. Program code embodying these processes may be stored by any one or more non-transitory tangible media, including a fixed disk, a volatile or non-volatile random-access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Implementations of process 200 may generally operate to identify a plurality of database queries, determine a first set of database queries which select from a same database table from the plurality of database queries, determine an estimated count of returned records for each of the first set of database queries, determine a second set of database queries from the first set of database queries having an total estimated count of returned records which is less than a threshold, determine a batch query based on the second set of database queries, determine a batch query result set based on the batch query, determine a result set based on the batch query result set for each of the second set of database queries, and return the result sets for each of the second set of database queries.

Initially, flow pauses at S205 until a list of queries waiting for transmission to a database is identified. The list of queries may comprise a queue of queries to be transmitted to a query-responsive data source, such as but not limited to a database. For example, S205 may include a determination of whether a database queue includes queries waiting for transmission. S205 may include waiting for a trigger event indicating that a number of queries within a queue has reached a predefined threshold. The queries may conform to any query language that is or becomes known.

According to some embodiments, the queries are Structured Query Language (SQL) queries. The queries may have been generated by an application in response to one or more requests received from one or more application users. As described above, the application users may be associated with one or more tenants, where each tenant is associated with respective data within the database which is not accessible to other tenants.

A database connection may comprise a communication channel usable by an application to transmit queries to the database and to receive responses to the queries. According to some embodiments, an application selects a database connection from a pool of available database connections and connects to the selected database connection to begin transmitting queries over the database connection.

Since a query cannot be sent over a database connection until a response to a last-sent query has been received, at any given point during runtime several queries may be waiting to be sent. These waiting queries may be stored within a queue associated with the database connection. Conventionally, the queries of the queue are transmitted over the database connection serially according to their order within the queue. If a database connection is available when a query is received, the query may be transmitted over the database connection without queueing and without resorting to execution of process 200.

At S210, a Total Count value, a Query Batch array, and a Table identifier are initialized. These parameters will be used as described below to batch queries of the list of queries into a single batch query.

A query is fetched from the list at S215. FIG. 3A illustrates list 300 of queries according to some embodiments. List 300 may be stored among queues 114 according to some embodiments. Each row of list 300 represents a query, and each row includes an identifier of a table from which the query selects and a returned record limit specified by the query. List 300 may include information in addition to that shown in FIG. 3A (e.g., the text of the query).

It is assumed that Query 1 is selected at S215. For purposes of the present example, Query 1 will be assumed as "SELECT ORDER_ID, ORDER_DATE FROM T05 WHERE ORDER_DATE>'2020 Feb. 1' ORDER BY ORDER_DATE LIMIT 300". At S220, the Table identifier is set equal to the table identifier of the table from which the query selects. According to the present example and FIG. 3A, the Table identifier is set to T05 at S220. It should be noted that a query may select from more than one table. In this case the Table identifier of S220 includes the identifiers of both tables.

The returned record count of the selected query is estimated at S225. The selected query may include a Limit parameter which specifies a maximum number of records to be returned by the query. The value of the Limit parameter may be set by a system administrator. In some embodiments, the returned record count is estimated to be equal to the value of the Limit parameter. In the case of Query 1, the record count is estimated as 300 at S225.

Next, at S230, one or more trigger conditions are evaluated. One trigger condition may be the availability of a database connection. If a database connection is available, a batch query should be generated based on the current query batch. Another trigger condition may be detected if adding the record count of the current query to the current total record count would result in a total record count greater than a threshold value representing a maximum desired count of records to be returned by the batch query to be generated by process 200. A third trigger event be detected if a total count of queries in the current query batch exceeds a threshold value.

In this first iteration of S230, the Total Count=0 so the resulting sum is 300. Assuming a threshold returned record value of 2000 (and that no other trigger conditions are detected at S230), flow proceeds to S235 to add the record count estimated at S225 to the current Total Count. The Total Count becomes 300 and the query is added to a current query batch at S240.

FIG. 3B illustrates query batch 350 including Query 1 of the present example. Query batch 350 is a list of queries from which a batch query will be generated and may be temporarily stored in batch queries 115. S240 may also comprise removing the added query from the original list of queries. For example, FIG. 3B also shows Query 1 having been removed from list 300.

A next query is fetched from the list at S245. At S250, it is determined whether a query was returned by the fetch action. If not, it is assumed that the list is empty. If a query was returned, flow proceeds to S255 to determine whether the table(s) associated the fetched query are the same table(s) identified by the current Table identifier.

In the present example, Query 2 is fetched from list 300 at S245 and it is determined at S255 that Query 2 selects from the same table (i.e., T05) as identified by the current Table identifier. Flow therefore proceeds to S225 to estimate a returned record count of Query 2. As shown in FIG. 3C, the record count (e.g., the specified returned record limit) of Query 2 is 700.

Again assuming no detection of trigger events at S230, the estimated record count of Query 2 (i.e., 700) is added to the current total count (i.e., 300) at S235 to create new Total Count 1000 and Query 2 is added to query batch 350 at S240. FIG. 3C shows query batch 350 after adding Query 2 and list 300 after removal of Query 2 at S240.

Flow continues as described above to fetch Query 3 (at S245 and S250). At S255, it is determined that the table from which Query 3 selects (i.e., Table T02) is not the table identified by the current Table identifier. Flow therefore returns to S245 to fetch a next query (i.e., Query 4) from list 300. Accordingly, Query 3 is not added to query batch 350 nor removed from list 300.

After fetching of Query 4 at S245 and determining a query was indeed fetched at S250, it is determined at S255 that Query 4 selects from the table identified by the current Table identifier. A returned record count of Query 4 is estimated as 700 at S225 per list 300. The sum of the estimated count and the current Total Count is 1700, which remains less than the threshold value of 2000. Assuming no other trigger events are detected, the Total Count is updated to 1700 at S235. Query 4 is then added to query batch 350 and removed from list 300 at S240 as shown in FIG. 3D.

Query 5 is fetched at S245 and determined that a query was indeed fetched at S250. At S255, it is determined that Query 5 selects from Table T04, which is not the table identified by the current Table identifier. Accordingly, Query 5 is not added to query batch 350 nor removed from list 300 and flow returns to S245 to fetch a next query (i.e., Query 6) from list 300 following S245 and S250.

It is then determined at S255 that Query 6 selects from the table identified by the current Table identifier. Next, at S225, the returned record count of Query 6 is estimated as 800 per list 300. A trigger event is detected at S230 since 800+1700 (i.e., the current Total Count)>2000. Flow proceeds from S230 to S265 to begin generation of a batch query from the current query batch (e.g., query batch 350).

It is noted that flow also proceeds to S265 to begin generation of a batch query from the current query batch if it is determined at S250 that no query remains in the list to be fetched (i.e., all queries have been fetched). According to some embodiments, flow may proceed to S265 from S230 if it is determined that the number of queries in the query batch has reached a predetermined maximum number.

A batch query is generated from the query batch at S265. The generated batch query is a single query which is intended to return all of the data specified by each query of the query batch. Batching according to some embodiments may change the order in which individual queries are issued from queue(s) 114 to database connector 116. For example, when database connector 116 becomes available, a batch query including Queries 1, 2 and 4 will be transmitted before the remaining Queries 3, 5 and 6. However, consistent with the general operations of the FIFO queue(s) 114, Query 5 will be transmitted after Query 3 and Query 6 will be transmitted after Query 5.

FIG. 4 illustrates query batch 400 from which a batch query is to be generated according to some embodiments of S265. Query batch 400 includes five SQL queries which each include the same SELECT clause (SELECT o.ORDER_ID, o.ORDER_DATE, o.ORDER_PRICE, o.ORDER_STATUS, p.PRODUCT_NAME, p.PRODUCT_DESC). Each of the five queries selects from tables Order and Product, but some of the queries are associated with a first database schema associated with a first database tenant (i.e., TENANT1_SCHEMA) while others of the queries are associated with a second database schema associated with a second database tenant (i.e., TENANT2_SCHEMA).

S265 may comprise combining or merging each of the queries of query batch 400 using UNION ALL clauses. As shown in batch query 500 of FIG. 5, a virtual column UNIQ_QUERY_ID is added to each query (now subclause). The virtual column name UNIQ_QUERY_ID may be stipulated as a reserved word which cannot be used by other tables.

Batch query 500 may be transmitted to a database at S270 through database connector 116 and a result set of the batch query 500 is received from the database at S275. The result sets are grouped by the UNIQ_QUERY_ID column to determine the result sets associated with each of the individual queries. FIG. 6 illustrates result set 600 of batch query 500 after separation at S280 according to some embodiments. At S285, the result sets associated with each query are then returned to the requesting application as responses to each query. For example, the portion of result set 600 associated with UNIQ_QUERY_ID "query1" is returned as a result set of query1, the portion of result set 600 associated with UNIQ_QUERY_ID "query2" is returned as a result set of query2, etc.

FIGS. 7 through 9 illustrate another example of S265-S280 according to some embodiments. Query batch 700 includes five SQL queries which each select from tables Order and Product but include different SELECT clauses. Some of the five queries are associated with a first database schema and others of the queries are associated with a second database schema.

At S265, all the queries of query batch 700 are combined using UNION ALL clauses, with a virtual column UNIQ_QUERY_ID is added to each query (i.e., subclause). Moreover, as shown in batch query 800, each query is modified so that all queries return values for the same set of columns. In the present example, if a query does not select from one or more of columns o.ORDER_ID, o.ORDER_DATE, o.ORDER_PRICE, o.ORDER_STATUS, p.PRODUCT_NAME, p.PRODUCT_DESC, the query is modified to include a dummy value of each of the one or more unselected columns (e.g., NULL AS "o.ORDER_PRICE").

Batch query 800 may be transmitted to a database at S270 via database connector 116 to receive a result set at S275. The result set is grouped by the UNIQ_QUERY_ID column at S280 to determine the result sets associated with each of the individual queries. FIG. 9 illustrates result set 900 of batch query 800 after separation at S280 according to some embodiments. Result set 900 include dummy values for each column which was not selected by an associated query. The result sets associated with each query are then returned to the requesting application as responses to each query at S285.

Figure 10:
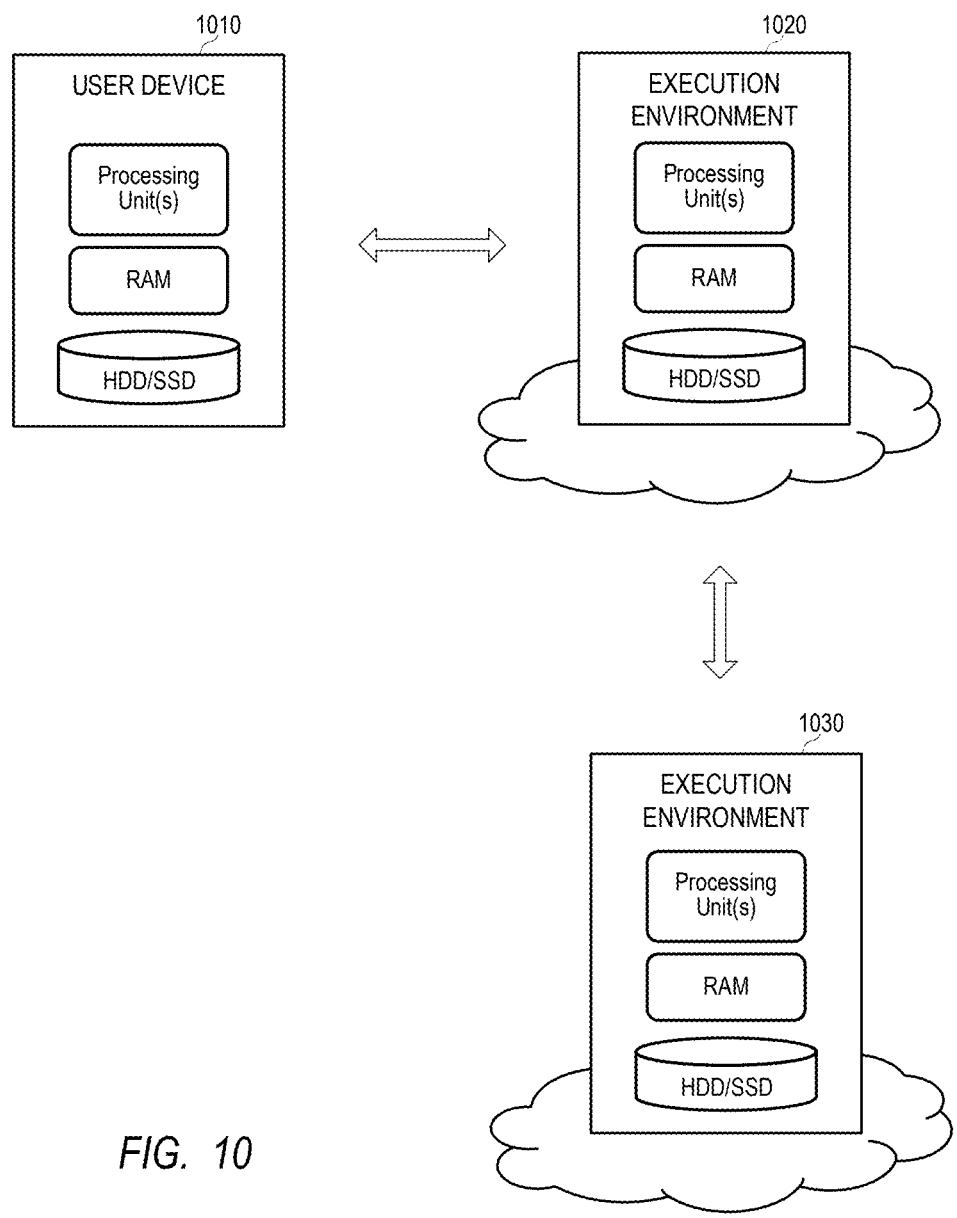
FIG. 10 illustrates a cloud-based architecture according to some embodiments.

FIG. 10 illustrates a cloud-based deployment according to some embodiments. The illustrated components may comprise cloud-based computing resources residing in one or more public clouds providing self-service and immediate provisioning, autoscaling, security, compliance and identity management features. Execution environments 1020 and 1030 may support containerized applications which provide one or more services to users. Execution environments 1020 and 1030 may comprise servers or virtual machines of a Kubernetes cluster.

A user may operate user device 1010 to submit requests to a service executing in execution environment 1020. The service may determine queries corresponding to the requests and generate batch queries based thereon as described above. The batch queries may be transmitted to a database service executing in execution environment 1030, which returns a corresponding result set to execution environment 1020.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of networks and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:
1. A system comprising:
a memory storing executable program code; and
one or more processing units to execute the executable program code to cause the system to:
receive a plurality of database queries;
determine a first set of database queries from the plurality of database queries,
where each of the first set of database queries requests data from a same database table, and
where a first one of the first set of database queries requests data from a first one or more columns of the database table and a second one of the first set of database queries requests data from a second one or more columns of the database table;
merge the first set of database queries into a batch query, the batch query including a subclause respectively associated with each of the first set of database queries,
where each subclause defines a query identifier column populated with an identifier of its respective database query,
a subclause associated with the first one of the first set of database queries defines NULL fields for ones of the second one or more columns which are not in the first one or more columns, and
a subclause associated with the second one of the first set of database queries defines NULL fields for ones of the first one or more columns which are not in the second one or more columns;
transmit the batch query to a database;
receive a batch query result set from the database;
for each of the first set of database queries, determine a result set from the batch query result set; and return the result sets for each of the first set of database queries.

2. The system of claim 1, wherein a first one of the first set of database queries is associated with a first database schema and wherein a second one of the first set of database queries is associated with a second database schema.

3. The system of claim 1, wherein the plurality of database queries are received from a queue, and the one or more processing units are to execute the executable program code to cause the system to:
  remove the first set of database queries from the queue to leave a second plurality of database queries in the queue.

4. The system of claim 3, the one or more processing units to execute the executable program code to cause the system to:
  determine a third set of database queries from the second plurality of database queries, where each of the third set of database queries requests data from a same second database table, and where a total count of returned records for the third set of database queries is less than the threshold;
  merge the third set of database queries into a second batch query;
  transmit the second batch query to the database;
  receive a second batch query result set from the database;
  for each of the third set of database queries, determine a second result set based on the second batch query result set; and
  return the second result sets for each of the third set of database queries.

5. The system of claim 1, wherein the plurality of database queries comprise a first queue associated with a first database connection, the one or more processing units to execute the executable program code to cause the system to:
  determine a second plurality of database queries of a second queue associated with a second database connection;
  determine a third set of database queries from the second plurality of database queries, where each of the third set of database queries selects from a second same database table;
  determine a second count of returned records for each of the third set of database queries;
  determine a fourth set of database queries from the third set of database queries, where a total second count of returned records for the fourth set of database queries is less than the threshold;
  determine a second batch query based on the fourth set of database queries;
  transmit the second batch query to the database;
  receive a second batch query result set from the database;
  for each of the fourth set of database queries, determine a second result set based on the second batch query result set; and
  return the second result sets for each of the fourth set of database queries.

6. The system of claim 1, wherein transmission of the batch query to the database comprises:
  determination that a database connector to the database is available; and
  transmission of the batch query to the database via the database connector only if it is determined that the database connector is available.

7. The system of claim 1, where the plurality of database queries comprises the first set of database queries and a second set of database queries, the one or more processing units to execute the executable program code to cause the system to:
  successively transmit each of the second set of database queries to the database after reception of the batch query result set from the database.

8. The system of claim 7, wherein the plurality of database queries are received from a queue, and wherein one of the second set of database queries was stored in the queue before one of the first set of database queries was stored in the queue.

9. The system of claim 1, where determination of the first set of database queries comprises determination that a number of the first set of database queries is less than a maximum number of queries to batch.

10. A method comprising:
  identifying a plurality of database queries in a queue;
  determining a first set of database queries of the plurality of database queries,
  where each of the first set of database queries requests data from a same database table, and
  where a first one of the first set of database queries requests data from a first one or more columns of the database table and a second one of the first set of database queries requests data from a second one or more columns of the database table;
  determining a batch query based on the first set of database queries the batch query including a subclause respectively associated with each of the first set of database queries,
  where each subclause defines a query identifier column populated with an identifier of its respective database query,
  a subclause associated with the first one of the first set of database queries defines NULL fields for ones of the second one or more columns which are not in the first one or more columns, and
  a subclause associated with the second one of the first set of database queries defines NULL fields for ones of the first one or more columns which are not in the second one or more columns;
  transmitting the batch query to a database;
  receiving a batch query result set from the database;
  for each of the first set of database queries, determine a result set from the batch query result set; and
  return the result sets for each of the first set of database queries.

11. The method of claim 10, further comprising:
  removing the first set of database queries from the queue to leave a second plurality of database queries in the queue;
  determining a third set of database queries from the second plurality of database queries, where each of the third set of database queries requests data from a same second database table, and where a total count of returned records for the third set of database queries is less than the threshold;
  determining a second batch query based on the third set of database queries;
  transmitting the second batch query to the database;
  receiving a second batch query result set from the database;
  for each of the third set of database queries, determining a second result set based on the second batch query result set; and
  returning the second result sets for each of the third set of database queries.

12. The method of claim 10, wherein the plurality of database queries comprises the first set of database queries and a second set of database queries, and
wherein one of the second set of database queries was stored in the queue before one of the first set of database queries was stored in the queue, the method further comprising:
successively transmitting each of the second set of database queries to the database after reception of the batch query result set from the database.

13. One or more non-transitory computer-readable media storing program code that, when executed by a computing system, causes the computing system to perform operations comprising:
receiving a plurality of database queries;
determining a first set of database queries from the plurality of database queries,
where each of the first set of database queries requests data from a same database table,
where a first one of the first set of database queries requests data from a first one or more columns of the database table and a second one of the first set of database queries requests data from a second one or more columns of the database table;
merging the first set of database queries into a batch query, the batch query including a subclause respectively associated with each of the first set of database queries,
where each subclause defines a query identifier column populated with an identifier of its respective database query,
a subclause associated with the first one of the first set of database queries defines NULL fields for ones of the second one or more columns which are not in the first one or more columns, and
a subclause associated with the second one of the first set of database queries defines NULL fields for ones of the first one or more columns which are not in the second one or more columns;
transmitting the batch query to a database;
receiving a batch query result set from the database;
for each of the first set of database queries, determining a result set from the batch query result set; and
returning the result sets for each of the first set of database queries.

14. The one or more non-transitory computer-readable media storing program code according to claim 13 that, when executed by the computing system, causes the computing system to perform operations comprising:
removing the first set of database queries from the queue to leave a second plurality of database queries in the queue;
determining third set of database queries from the second plurality of database queries, where each of the third set of database queries requests data from a same second database table;
merging the third set of database queries into a second batch query;
transmitting the second batch query to the database;
receiving a second batch query result set from the database;
for each of the third set of database queries, determining a second result set based on the second batch query result set; and
returning the second result sets for each of the third set of database queries.

* * * * *